United States Patent
Halim et al.

(10) Patent No.: US 10,234,910 B2
(45) Date of Patent: *Mar. 19, 2019

(54) COMPUTING DEVICE EXPANSION SYSTEM

(71) Applicant: Hewlett-Packard Development Company, L.P., Houston, TX (US)

(72) Inventors: Irwan Halim, Houston, TX (US); Thomas J. Flynn, Magnolia, TX (US); Louis R. Jackson, Jr., Tomball, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/437,192

(22) Filed: Feb. 20, 2017

(65) Prior Publication Data
US 2017/0160768 A1     Jun. 8, 2017

Related U.S. Application Data

(63) Continuation of application No. 13/910,285, filed on Jun. 5, 2013, now Pat. No. 9,612,628.

(51) Int. Cl.
*G06F 1/16* (2006.01)
*G06F 3/14* (2006.01)
*G06F 3/0488* (2013.01)

(52) U.S. Cl.
CPC .......... *G06F 1/1698* (2013.01); *G06F 1/1613* (2013.01); *G06F 1/1632* (2013.01); *G06F 3/0488* (2013.01); *G06F 3/1454* (2013.01)

(58) Field of Classification Search
CPC ........ G06F 1/00; G06F 1/1632; G06F 1/1654; G06F 3/12
See application file for complete search history.

(56) References Cited

U.S. PATENT DOCUMENTS

| | | |
|---|---|---|
| 6,208,508 B1 | 3/2001 | Ruch et al. |
| 6,473,789 B1 | 10/2002 | Chen et al. |
| 8,072,392 B2 | 12/2011 | Lection |
| 2007/0010289 A1 | 1/2007 | Mezue |
| 2013/0076638 A1* | 3/2013 | Sirpal .................. G06F 3/1438 345/169 |

FOREIGN PATENT DOCUMENTS

CN          202008616          10/2011

OTHER PUBLICATIONS

Haddock, J.; "Dual Display Clone with the Intel Graphics Driver"; Nov. 5, 2008; 1 page.

* cited by examiner

*Primary Examiner* — Michael A Faragalla
(74) *Attorney, Agent, or Firm* — HPI Patent Department

(57) ABSTRACT

Examples of the present disclosure provide a computing device expansion system. According to one implementation, a docking receptacle is coupled to a touch-enabled monitor computing device and is also configured to receive and connect to a portable electronic device. Furthermore, when the portable electronic device is attached to the docking receptacle, a display area of the portable electronic device is cloned on the monitor computing device such that touch input on either the portable electronic device or monitor computing device is replicated on the monitor computing device or portable electronic device.

15 Claims, 4 Drawing Sheets

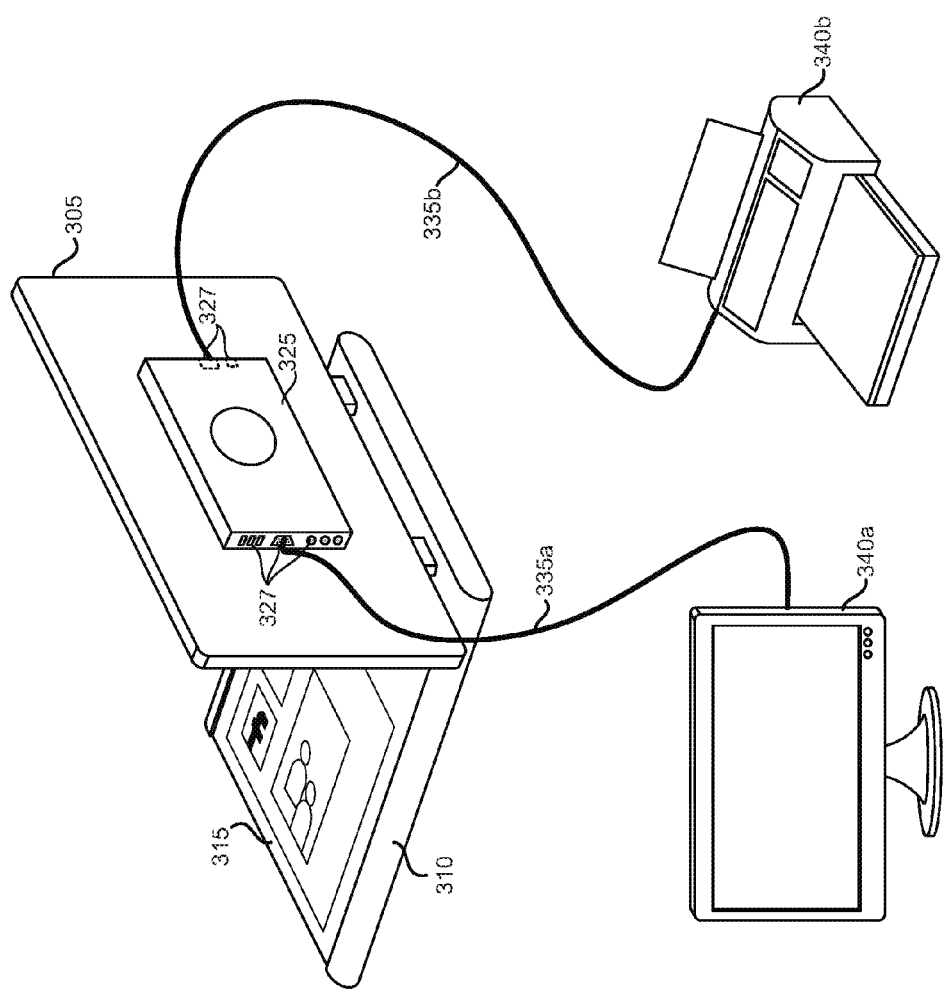

COMPUTING DEVICE EXPANSION SYSTEM

PRIORITY APPLICATION INFORMATION

This application is a continuation of U.S. application Ser. No. 13/910,285 filed on Jun. 5, 2013, the contents of which are incorporated herein by reference in its entirety.

BACKGROUND

The emergence and popularity of mobile computing has made portable electronic devices, due to their compact design and light weight, a staple in today's marketplace. One such electronic device, tablet computing systems, employ touch-based input methods that allow a user to physically touch an associated display and have that touch registered as an input at the particular touch location, thereby enabling a user to interact physically with objects shown on the display of the electronic device. Conversely, desktop computing systems generally include a keyboard for allowing a user to manually input information (e.g., characters) into the computer system, and a mouse for selecting or highlighting items shown on an associated display unit. All-in-one (AIO) computer systems, which integrate the system's internal components into the same case as the display, offer the touch input functionality of the tablet devices while also providing the processing power and viewing area of traditional desktop computing systems. Despite the growth in popularity of portable devices, however, effective interaction and synergy between tablet and desktop and AIO computing systems is still desired.

BRIEF DESCRIPTION OF THE DRAWINGS

The features and advantages of the disclosure as well as additional features and advantages thereof will be more clearly understood hereinafter as a result of a detailed description of examples when taken in conjunction with the following drawings in which:

FIG. 3 is a three-dimensional illustration of an operating environment utilizing the computing device expansions system according to an example of the present disclosure.

DETAILED DESCRIPTION OF THE INVENTION

Figure 1:
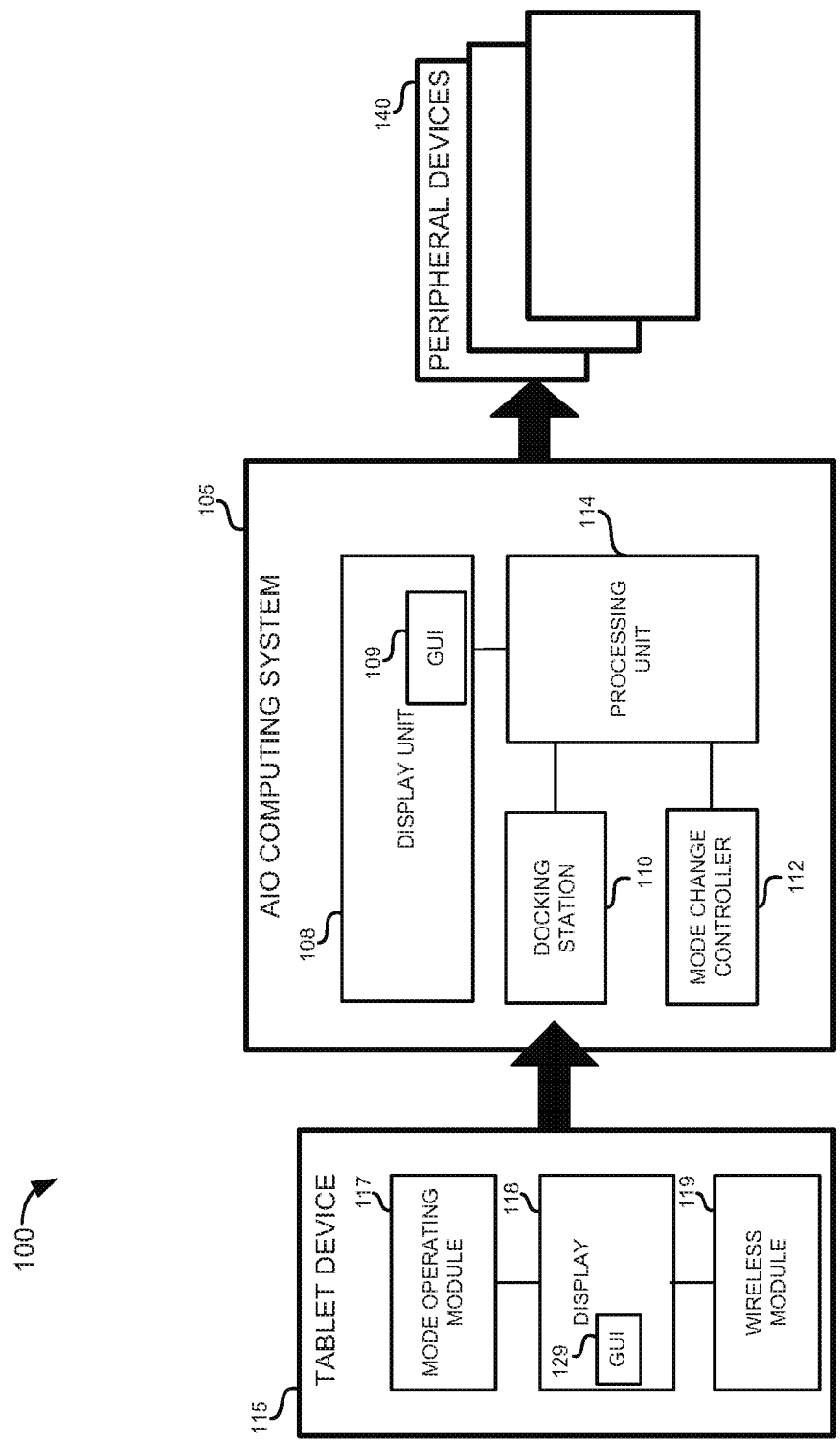
FIG. 1 is a simplified block diagram of the computing device expansion system according to an example of the present disclosure.

The following discussion is directed to various examples. Although one or more of these implementations may be discussed in detail, the examples disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Today, more and more companies are adopting the "Bring Your Own Device" (BYOD) concept to further reduce IT support cost, and a growing number of employees are starting to bring their tablets into the workplace as the primary work device. However, there are many downsides to using a tablet to replace a workstation. For instance, the smaller display of tablet devices makes it difficult to read, create, and edit large amounts of content on such a device for an entire work day. Additionally, typing and other input is difficult, in addition to a dearth of on-board peripheral ports for connecting wired peripheral devices. These limitations have negatively affected employee's productivity when working in a "Bring Your Own Device" enterprise environment.

Examples of the present disclosure provide a computing device expansion system. According to one example, an all-in-one computing system includes a base docking receptacle configured to receive a tablet device. When the tablet device is docked within the receptacle, the display of the tablet computing device is automatically cloned on the display of the all-in-one computer such that touch input functionality on the tablet device or all-in-one computing device is replicated on the all-in-one-computing system or tablet device respectively. In addition, the peripheral ports and connected devices are automatically installed and useable by the tablet computing device without user intervention. Accordingly, examples of the present disclosure help to enhance and expand the functionality and usefulness of tablet devices in a BYOD workplace environment.

Referring now in more detail to the drawings in which like numerals identify corresponding parts throughout the views, FIG. 1 is a simplified block diagram of the computing device expansion system according to an example of the present disclosure. As shown in this example, the system 100 includes a monitor computing system 105 and a portable electronic device such as tablet computer 115. The monitor computing system 105, such as an all-in-one computer, includes a processing unit 114, display unit 108, docking station 110, and a mode change controller 112. In one example embodiment, processor 114 represents a central processing unit (CPU), microcontroller, microprocessor, or logic configured to execute programming instructions associated with the monitor computing system 105. Display unit 108 represents an electronic visual display configured to display images and/or graphical user interface 109 for enabling touch input interaction between a user and the monitor computing system 105. The docking receptacle 110 represents a docking unit coupled—either directly as a base to the monitor or as a standalone unit—to the computing system 105. The mode change controller 112 represents a state change controller and is configured to change the operating mode of the monitor computing system (AIO) 105 from a normal operating mode (e.g., AIO as primary computer) to a clone operating mode (e.g., tablet as primary computer). Peripheral devices 140 represent any auxiliary device configured to connect to and work with the AIO computer 105 via a wireless or wired connection with a peripheral port. For example, the peripheral device may include a printer, external mouse and/or keyboard, external hard drive, secondary monitor, scanner device, webcam, or the like.

Furthermore, the tablet computing device 115 includes a display, mode operating module 118, and a wireless module 119. The display 118 represents a touch-based interface and includes a graphical user interface (GUI 129) for enabling touch-based interaction between a user and the tablet computing device 115. The mode operating module 117 represents configured to enable dual-mode functionality and switch the tablet device 115 from a normal tablet operating mode to a replicate mode or input operating mode in which the display of the tablet device 115 is replicated on the AIO computer monitor 105 such that input from a user with respect to the tablet computing system 115 and graphical user interface 129 is also shown on the AIO computer monitor 105. According to one example, the wireless module 119 represents wireless communication (e.g., via an infrared signal, Bluetooth, NFC) to aid in establishing wireless communication with the AIO computing device 105 for facilitating the cloning/replicating operating mode.

Figure 2A:
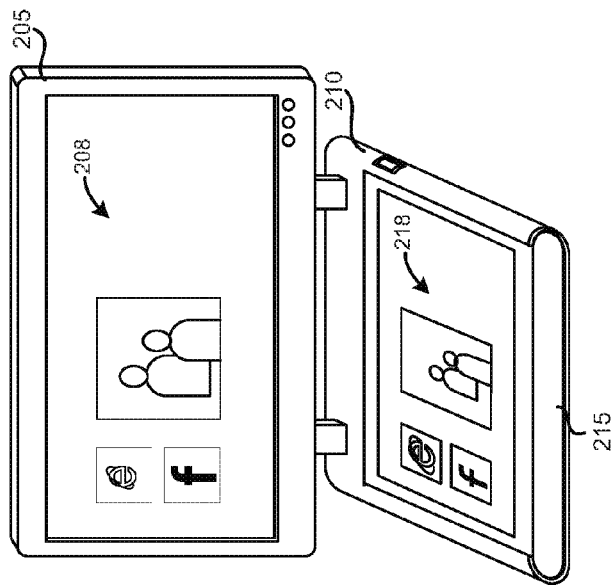
FIGS. 2A and 2B are three-dimensional perspective views of the computing device expansion system according to an example of the present disclosure.
Figure 2B:
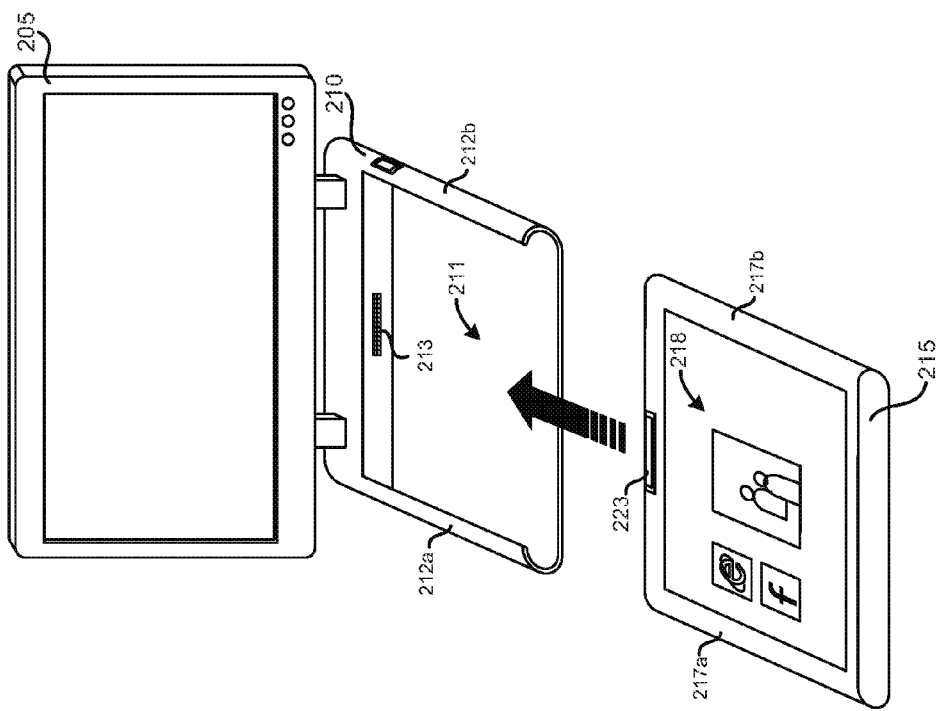

FIGS. 2A and 2B are three-dimensional perspective views of the computing device expansion system according to an example of the present disclosure. As shown here, the system 200 includes a desktop or primary computer 205 and tablet computing device 215. In the present example, the AIO computer 205 includes all requisite computing components such as memory module, a processing unit, and a display. In one example, the base of the AIO computer 205 includes a docking receptacle 210. That is, the docking receptacle 210 may function as a tool for receiving the tablet computer 215 and a support stand or base for the AIO computer 205. The docking receptacle 210 includes a docking area 211 for receiving the tablet computing device 215 in addition to a contact portion 213 for establishing a docking connection with the tablet computing device 215 within the docking area 211. The docking receptacle 210 also includes a pair of elongated gripping portions 212*a* and 212*b* for retaining the tablet device 215 in a fixed state upon the tablet device 215 being slid in and docked within the docking area 211. As shown here, the base receptacle 210 is configured with an open side area opposite the attachment side (with the display monitor 205) and includes elongated portions 212*a* and 212*b* so that the tablet device 215 may easily slide inward toward the display 205 and into the docking area 211 as shown in FIG. 2B.

Still further, the tablet computing device 215 includes a viewable display area 218 and parallel side portions 217*a* and 217*b*. A female connector 223 may be formed on one side of the tablet device 215 for establishing a physical electrical connection with the contact portion 213 of the docking receptacle 210. Moreover, when docked within the docking area 211 as shown in FIG. 2B, the side portions 217*a* and 217*b* of the tablet device 215 are gripped and held firmly in place by gripping portions 212*a* and 212*b* of the docking receptacle 210 upon the tablet device 215 being slid into place within the docking area 211. In accordance with one example, and as shown in FIG. 2B, the secondary or cloning operating mode represents functionality that enables the display 216 of the tablet computing device 215 to serve as the display associated with the primary computer 205. That is, data and information presented on the GUI of the display 208 and tablet computing device 215 is cloned and replicated on GUI and display 208 of the AIO computer 205. Data may be streamed to the AIO computer 205 from the tablet device 215 through connection with the docking connector 213, over a local area network or similar wireless protocol. According to one example, when the tablet computer 215 is slid into and connected with the base or docking receptacle 210 of the AIO computing system 205, the tablet device 210 may be charged and the monitor or display 208 becomes the primary display for the tablet device 215. In such a configuration, touch input functionality is also expanded as user-generated touch input may be received and processed either on the tablet device 215 or the AIO computer display 205. Moreover, the operating user may also have the option to clone the display of the AIO computer 205 on the tablet device 215 while retaining all the touch capabilities on the tablet device 215, or use the tablet device 215 as human interface input device only (touch screen and keyboard). In addition, all the peripheral ports (e.g., USB, DVI, PS-2, etc.) and connected devices become available to the tablet device 215 as will be further described with reference to FIG. 3. According to one example, the slide-in docking area 211 of the docking base receptacle 210 includes a locking mechanism 214 configured to lock the tablet device within the receptacle 210 so as prevent theft or inadvertent removal of said device.

FIG. 3 is a three-dimensional illustration of an operating environment utilizing the computing device expansions system according to an example of the present disclosure. As shown here, the AIO computing device 305 may also include a peripheral port panel 325 formed on a back side (side opposite display surface) thereof. The port panel 325 may include a one or more peripheral ports (e.g., USB, DVI, PS-2, etc.) for connecting with one or more peripheral devices 340 (e.g., printer, external drive, secondary display, etc.) via wired connections (e.g., 335 and 335*b*). According to one example, the port panel 325 (and base receptacle 310) may be pre-manufactured with the AIO computing device or installed separately such that it can be retrofitted to any existing AIO device, monitor, or similar display unit via any mounting interface standard (e.g., VESA) or by replacing the entire back panel assembly of the AIO computer or monitor for example. In the event a peripheral device is attached to the port panel 325 of the AIO computer 305 and the tablet device 315 is docked within the docking receptacle 310, the connected peripheral device will be detected and installed on the tablet device 315. For example, the secondary monitor 340*a* and connected printer 340*b* may be installed and available for use by the tablet device 315 when in the docked state. In the multi-monitor use case involving peripheral monitor 340*a*, DVI or similar ports may be positioned on each side of the port panel 325 such that the layout and orientation of the monitor is automatically set based on which side of the port panel 325 the device is connected. For example, when a secondary monitor 340*a* is attached to the left side of the DVI port, it automatically extends the display area (e.g., 208 of FIG. 2*b*) to the left of the AIO computer monitor 305.

Figure 4:
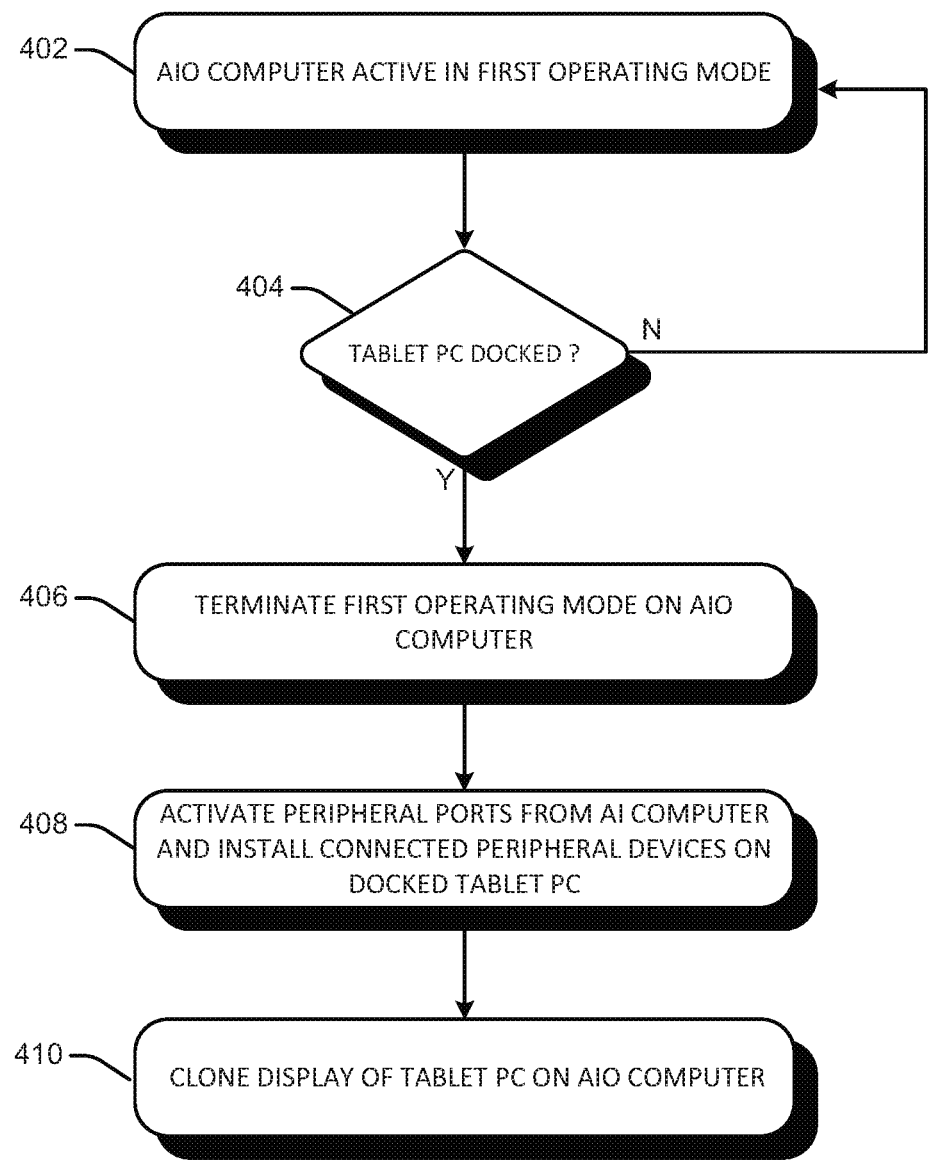
FIG. 4 is a simplified flow chart of the processing steps for enabling the computing device expansion system in accordance with one example of the present disclosure.

FIG. 4 is a simplified flow chart of the processing steps for enabling the computing device expansion system in accordance with one example of the present disclosure. In step 402, the AIO computing system operates in a first or normal operating mode in which the AIO computing system operates as the primary computer. Upon detecting that a tablet device is docked and connected to the docking receptacle in step 404, the processing unit and mode change controller of the AIO computer terminates the first operating mode on the AIO computer and prepares to activate the secondary operating mode in step 406. Alternatively, a connection with the tablet device may be established through detection of the presence of the tablet device within a threshold proximity of the primary computing system. The threshold proximity may be configured by the operating user or manufacturer and may represent the tablet device being positioned within a usable operating distance of the primary computer (e.g., within two feet), or a sufficient distance for establishing a short-range wireless connection. Thereafter, in step 408 the peripheral ports are activated and any connected devices are installed on the docked tablet device. In addition, data from the tablet device may be transferred and synchronized with the primary computing system. In step 410, the second operating mode represents is activated by establishing a cloning environment in which the display of the tablet device is replicated on the display associated with the AIO computer such that touch input on the docked tablet device is also shown on the AIO computer system, and touch input on the AIO computer system is replicated on the docket tablet device.

Examples described herein provide a computer device expansion system. Moreover, many advantages are afforded by the expansion system according to implementations of the present disclosure. For instance, an example of the present disclosure enables AIO computing system to automatically expand the functionality of the tablet device so as to allow an extended viewing and touch input area along with access to any connected peripheral device. In addition, the docking receptacle may double as a stand support for the AIO computer so as to reduce manufacturing costs or allow for a simplified retrofit accessory for existing monitors. Still further, examples described herein provide a robust solution that enables the tablet computing device to be widely accepted as traditional PC replacements in a BYOD enterprise environment.

Furthermore, while the disclosure has been described with respect to example embodiments, one skilled in the art will recognize that numerous modifications are possible. For example, although the present examples depict an AIO computer as the monitor computing system, the disclosure is not limited thereto. For example, the monitor computing system may be a television monitor, laptop device, netbook, or similar computing system capable of expanding the viewing area and peripheral device access of a portable electronic device such as a tablet computer. Similarly, the portable electronic device may represent a smartphone or hybrid notebook computer for example.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element. In addition, the term "having" and "including" is synonymous comprising.

It is to be noted that, although some examples have been described in reference to particular implementations, other implementations are possible according to some examples embodiments. Additionally, the arrangement o order of elements or other features illustrated in the drawings or described herein need not be arranged in the particular way illustrated and described. Many other arrangements are possible according to some examples.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A computing device expansion system comprising:
   a monitor computing device that accepts touch-based input, wherein the monitor computing device includes a mounting interface and a display surface;
   a docking receptacle to receive a portable electronic device; and
   a mode change controller to:
      clone a display area of the portable electronic device onto the display surface of the monitor computer device such that touch input on the portable electronic device is replicated on the monitor computing device when the portable electronic device engages with the docking receptacle; and
      connect with the portable electronic device by detecting the portable electronic device within proximity of the monitor computing device.

2. The expansion system of claim 1, further comprising the mode change controller to clone the display area of the monitor computing device onto the display surface of the portable electronic device such that touch input of the monitor computing device is replicated on the portable electronic device.

3. The expansion system of claim 1, wherein the mode change controller causes the monitor computer device to switch from a normal operating mode to a cloning operating mode when the portable electronic device engages with the docking receptacle.

4. The expansion system of claim 1, wherein a plurality of peripheral ports associated with the monitor computing device become active and useable by the portable electronic device when monitor computer device switches to cloning mode.

5. The expansion system of claim 4, wherein an auxiliary device associated with a peripheral port is automatically installed on the portable electronic device when the monitor computing device switches to cloning mode.

6. A computing device expansion system comprising:
   an all-in-one (AIO) computing device including a touch-enabled monitor display surface and peripheral ports;
   an attached base docking unit including a docking receptacle to receive a portable electronic device; and
   a mode change controller to:
      clone a display area of the portable electronic device onto the display surface of the AIO computing device such that touch input on the portable electronic device is replicated on the AIO computing device and touch input on the AIO computing device is replicated on the portable electronic device when the portable electronic device engages with the docking receptacle; and connect with the portable electronic device by detecting the portable electronic device within proximity of the monitor computing device.

7. The expansion system of claim 6, wherein a touch input on the portable electronic device is processed by the AIO computing device.

8. The expansion system of claim 6, wherein when the portable electronic device is docked within the docking receptacle, a connected auxiliary device is automatically installed and becomes useable by the portable electronic device.

9. The expansion system of claim 6, wherein the docking receptacle includes:
   a docking area including elongated holding portions formed on opposite sides for gripping side areas of the portable electronic device when the portable electronic device is attached to the docking receptacle; and
   a contact portion formed within the docking area.

10. The expansion system of claim 9, wherein the AIO computing device switches from a normal operating mode to a cloning operating mode upon a docking connector of the portable electronic device engaging with the contact portion of the docking area of the docking receptacle.

11. A method for providing a computer device expansion system, the method comprising:
   activating a first operating mode on an all-in-one (AIO) computer system including a touch-enabled display surface and peripheral ports, wherein the AIO computing device includes a mounting interface;
   detecting, via a docking receptacle, a docking connection with a portable electronic device;
   detecting a connection between the portable electronic device and an auxiliary device; and
   cloning a display area of the portable electronic device on the display surface of the AIO computer system such that touch input on the portable electronic device is replicated on the AIO computer system and the touch input on the AIO computer system is replicated on the portable electronic device; and
   connecting with the portable electronic device by detecting the portable electronic device within proximity of the monitor computing device.

12. The method of claim 11, further comprising:
   cloning a display area of the AIO computer system on the display surface of the portable electronic device; and
   processing a touch input of the AIO computer system at the portable electronic device.

13. The method of claim 11, wherein detecting a connection between the portable electronic device and the auxiliary device includes automatically installing the auxiliary device on the portable electronic device.

14. The method of claim 11, further comprising switching the AIO computing system from the first operating mode to a second operating mode when a docking connector of the portable electronic device engages with a contact portion of the docking area of the docking receptacle.

15. The method of claim 14, wherein switching the AIO computing system from the first operating mode to the second operating mode comprises:
   determining that the portable electronic device is engaged with a contact portion of the docking area; and
   cloning the display area of the AIO computing system on the display area of the portable electronic device.

* * * * *